J. Slater,
Circular Saw Mill.
N° 11,912.          Patented Nov. 7, 1854.
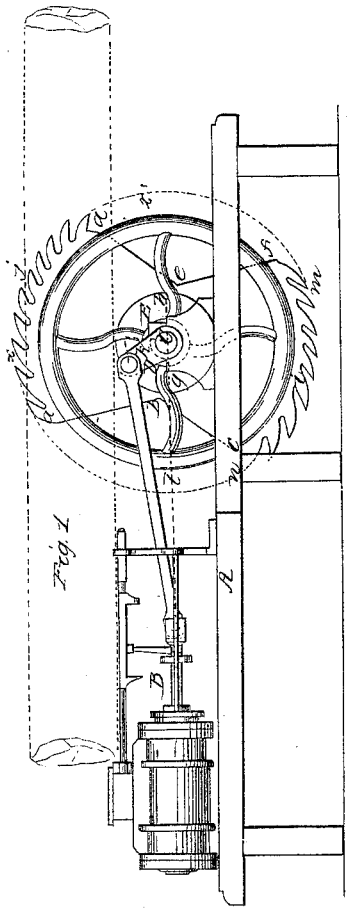
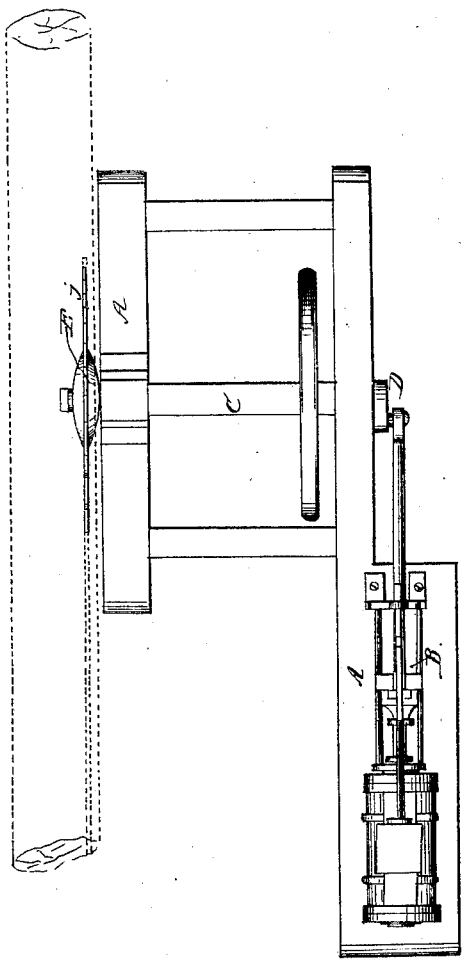

UNITED STATES PATENT OFFICE.

JAMES SLATER, OF MACON, GEORGIA.

FORM FOR AND MODE OF OPERATING CIRCULAR SAWS.

Specification of Letters Patent No. 11,912, dated November 7, 1854.

*To all whom it may concern:*

Be it known that I, JAMES SLATER, of Macon, in the county of Bibb and State of Georgia, have invented a new and useful Improvement in Circular Saws for Saw-mills; and I do hereby declare that the following is a full, clear, and exact description of the same, reference being had to the accompanying drawings, forming part of this specification, in which—

Figure 1, is a side elevation of a saw mill with my improved saw applied to it. Fig. 2, is a plan or top view of the same.

The same letters of reference in each of the two figures indicate corresponding parts.

This invention relates to circular saws for saw mills, and is intended to relieve the engine when the crank pin gets on the dead center.

The nature of said invention consists, in cutting out portions of the edge of the saw at places opposite to one another, and so arranging it in relation to the crank pin, that its teeth will not come in contact with the board or log while the said crank pin is on either of the dead centers.

To enable others skilled in the art to make and use my invention, I will proceed to describe its construction and operation.

A, in the accompanying drawing, represents a frame for supporting the engine and driving shaft.

B, is the engine, C, the driving or crank shaft, and D, the crank—these parts are arranged, and operate, in the usual manner.

E, is the circular saw, having hook or other suitable shaped teeth. It has portions of its edge cut away, as shown at $a$, $b$, $c$, and $d$, $e$, $f$. By examining the drawing it will be seen that the space, $a$, $b$, $c$, is opposite to that $d$, $e$, $f$. The saw is arranged on the end of the crank shaft C, as shown in Fig. 2, and the spaces $a$, $b$, $c$, and $d$, $e$, $f$, stand in such relation to the crank pin when it comes on the dead center $g$, or $h$, that the saw teeth $i$, or $j$, do not come in contact with the board or log until the said pin passes the dead center $g$, or $h$, and consequently, no resistance is offered to the engine while moving said pin off either of said centers.

By examining the drawing, Fig. 1, it will be seen that when the crank stands in the position shown in black, a portion of the teeth of the saw will have commenced operating upon the log, and when it stands even with the red dotted line $k$, the saw will be moved to the points $x$, $x'$, shown in red, and its teeth will be cutting the full thickness of the log. And again when the crank is moved on the dead center $h$, as illustrated by the red line $l$, the teeth $j$, of the saw are moved, and made to occupy a place between the point $x'$, and $m$, as shown by the red line, and the teeth $i$, caused to occupy a position between the points $n$, and $x$. When the teeth occupy the positions just stated, it may be evident that they are out of contact with the log, and that no resistance is offered to the engine while the crank is being moved off the center.

The advantage of this mode of constructing and arranging the saw must be evident to those acquainted with the difficulty of moving the crank off the dead centers, while the saw is cutting.

What I claim as my invention, and desire to secure by Letters Patent, is:—

Cutting out portions of the edge of the saw, at points opposite to one another, and arranging it in such relation to the crank pin, that its teeth will not come in contact with the board or log, while the said crank pin is on either of the dead centers, substantially as, and for the purpose herein described.

JAMES SLATER.

Witnesses:
WM. J. McELROY,
JOHN LENINDLEPURST,
HENRY PELLEW.